March 17, 1931.   S. W. AVIS ET AL   1,796,681
APPARATUS FOR MAKING NUTS
Filed June 23, 1928   13 Sheets-Sheet 1

INVENTOR
J. W. Avis & M. H. Ames
BY
Pennie, Davis, Marvin & Edmonds
ATTORNEYS

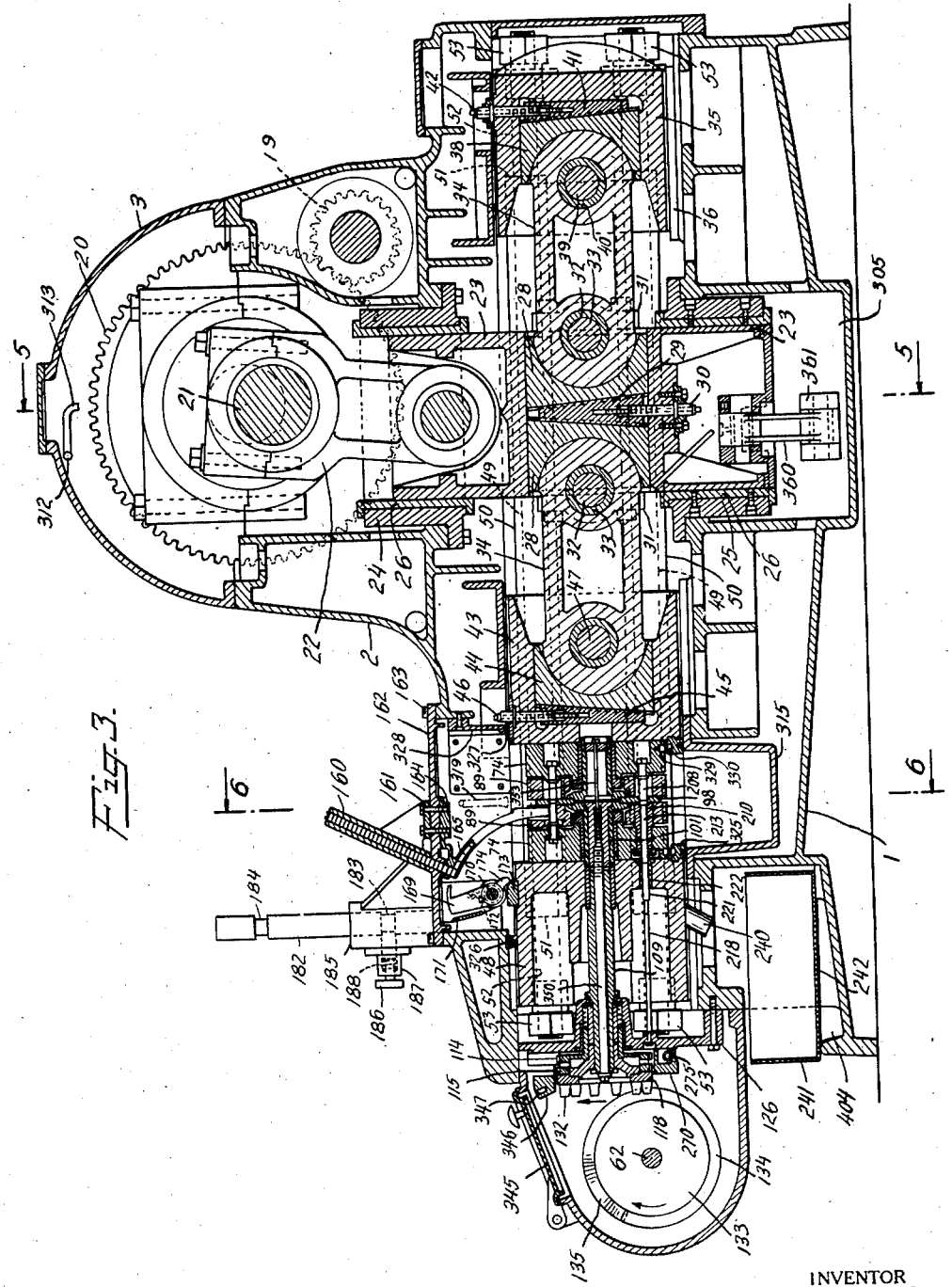

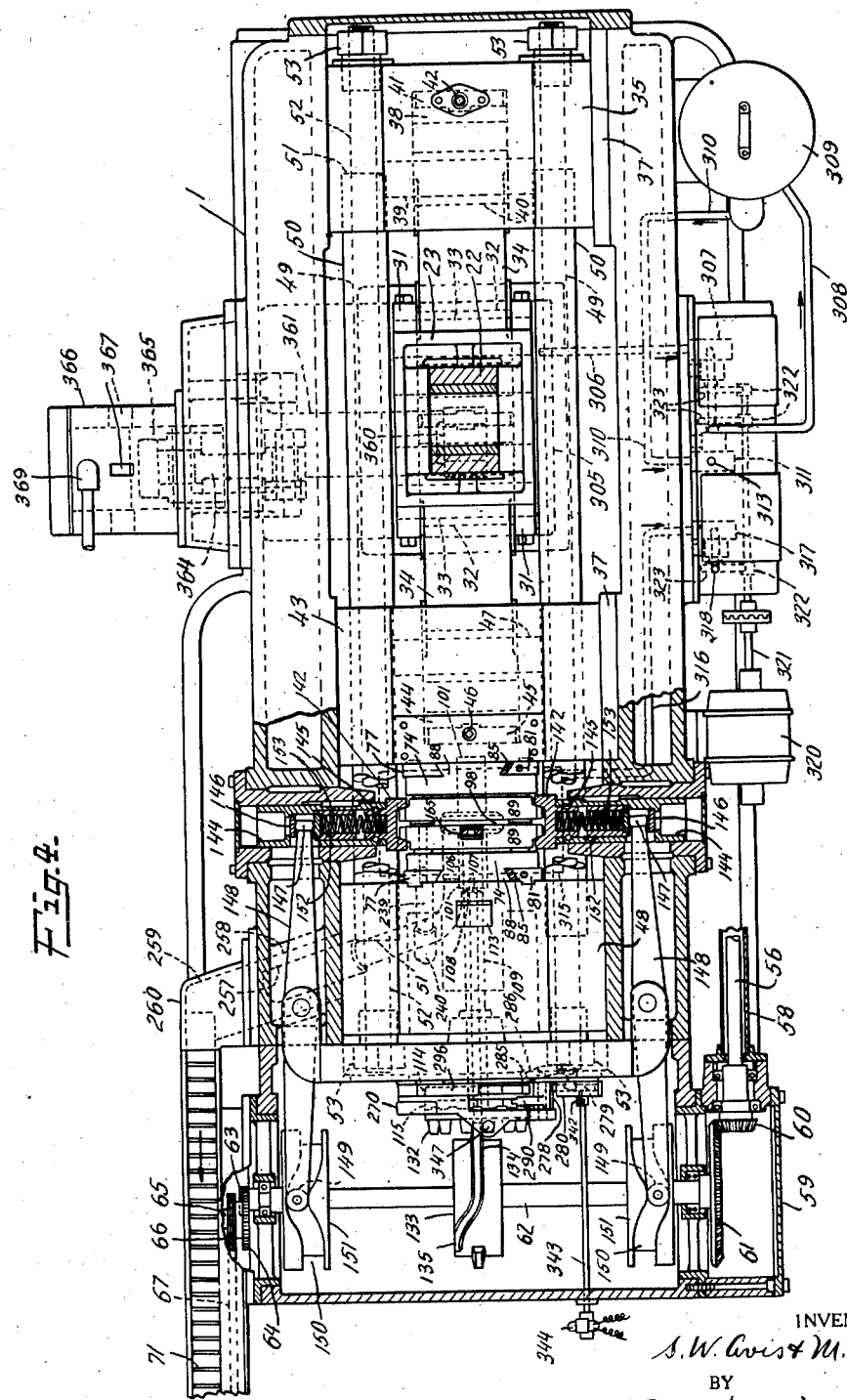

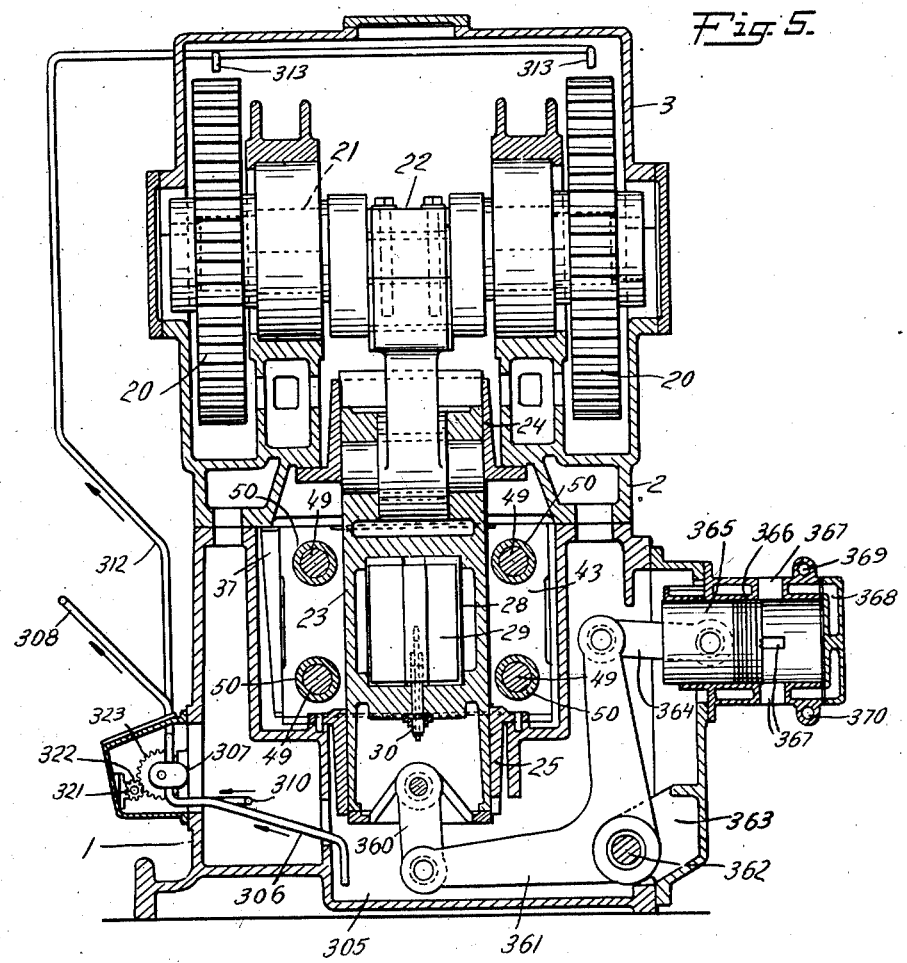

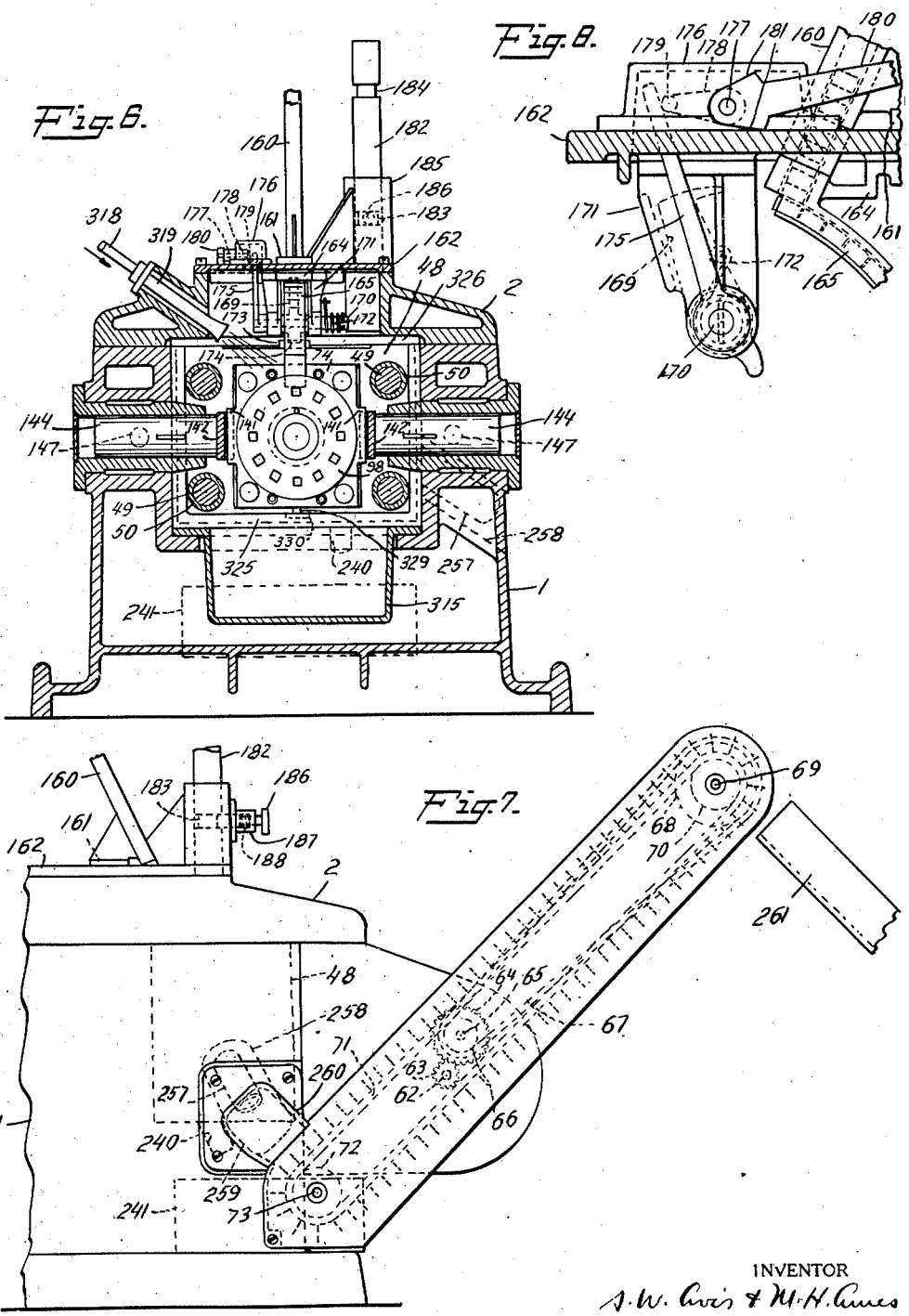

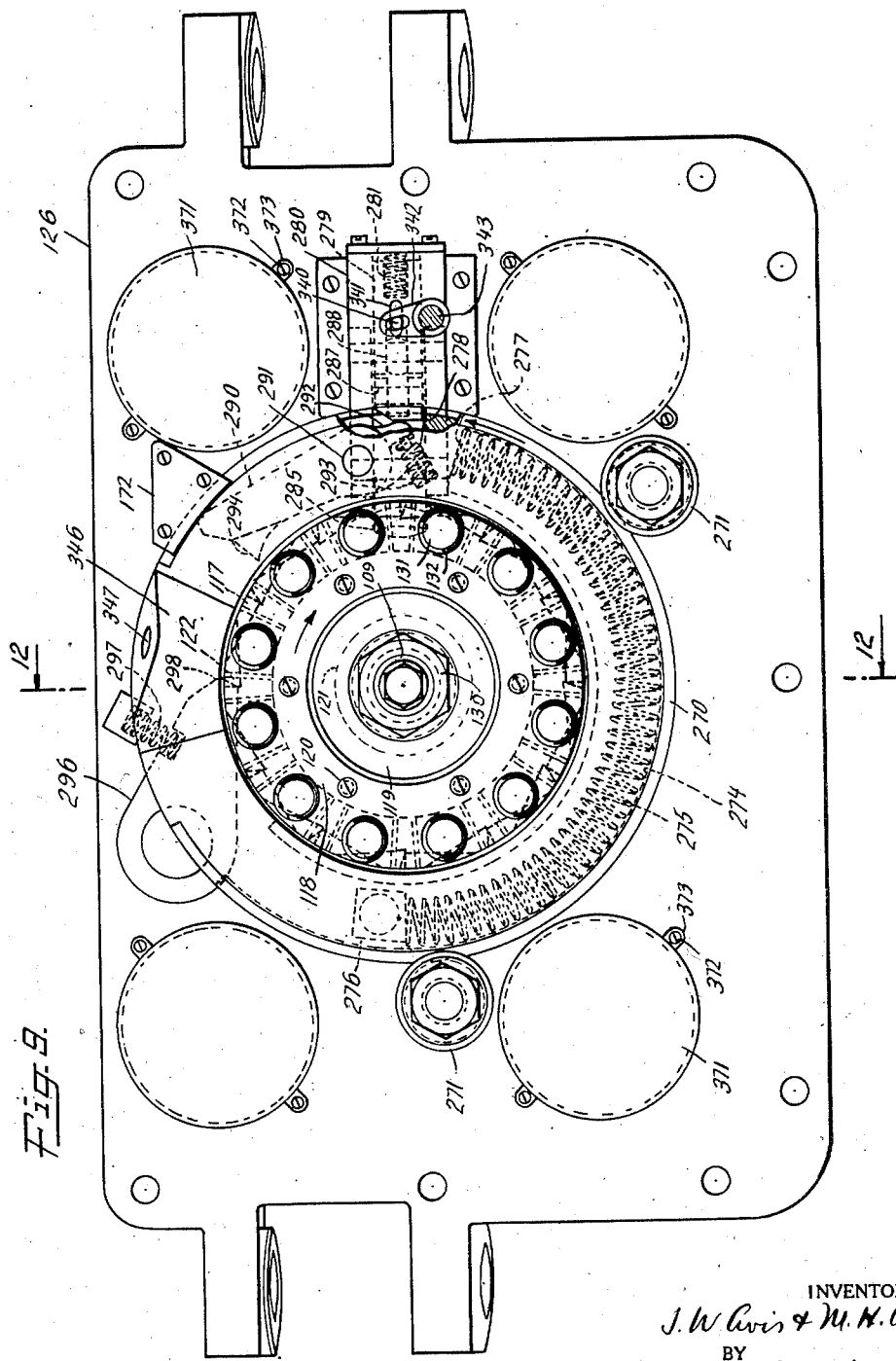

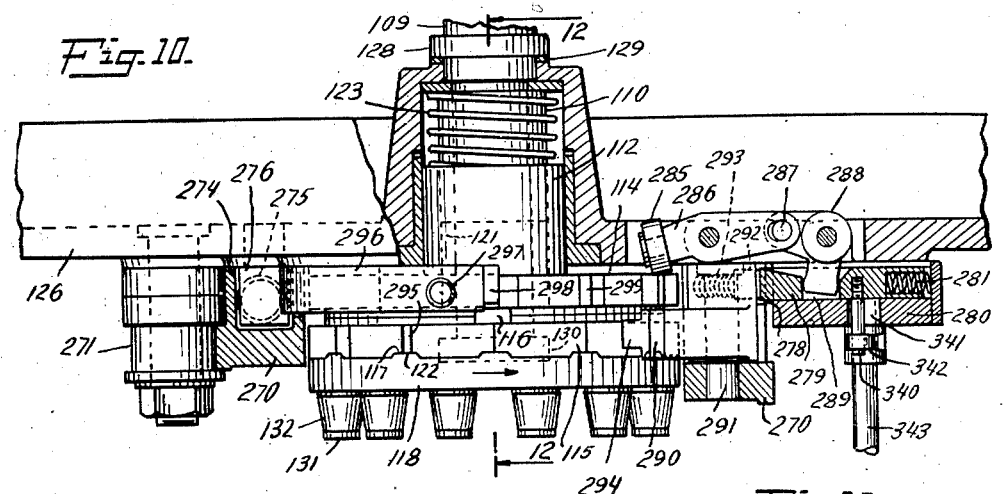
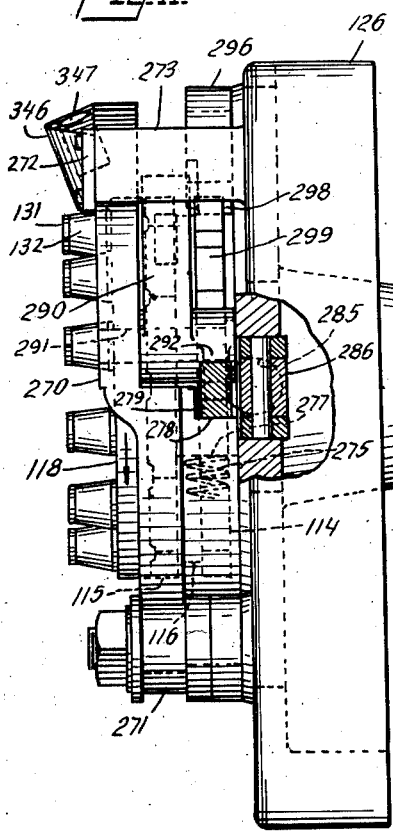
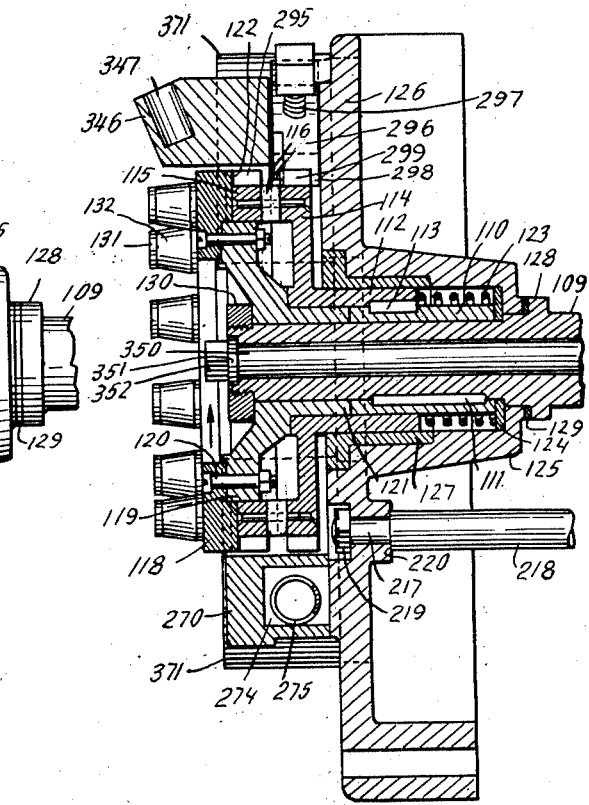

March 17, 1931.  S. W. AVIS ET AL  1,796,681

APPARATUS FOR MAKING NUTS

Filed June 23, 1928  13 Sheets-Sheet 8

INVENTOR
S. W. Avis & M. H. Cimes
BY
Pennie, Davis, Marvin & Edmonds
ATTORNEYS

March 17, 1931.  S. W. AVIS ET AL  1,796,681
APPARATUS FOR MAKING NUTS
Filed June 23, 1928   13 Sheets-Sheet 9
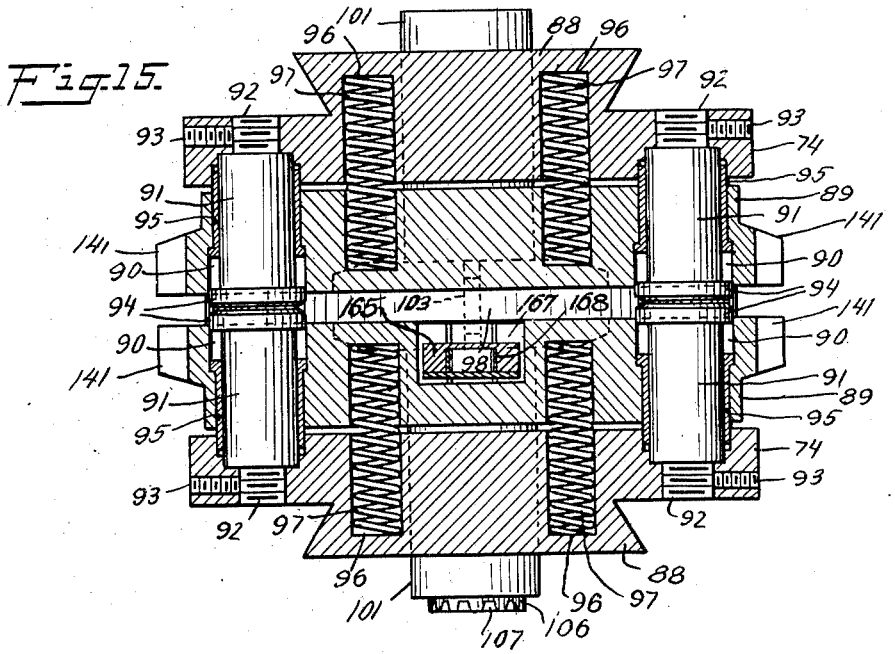
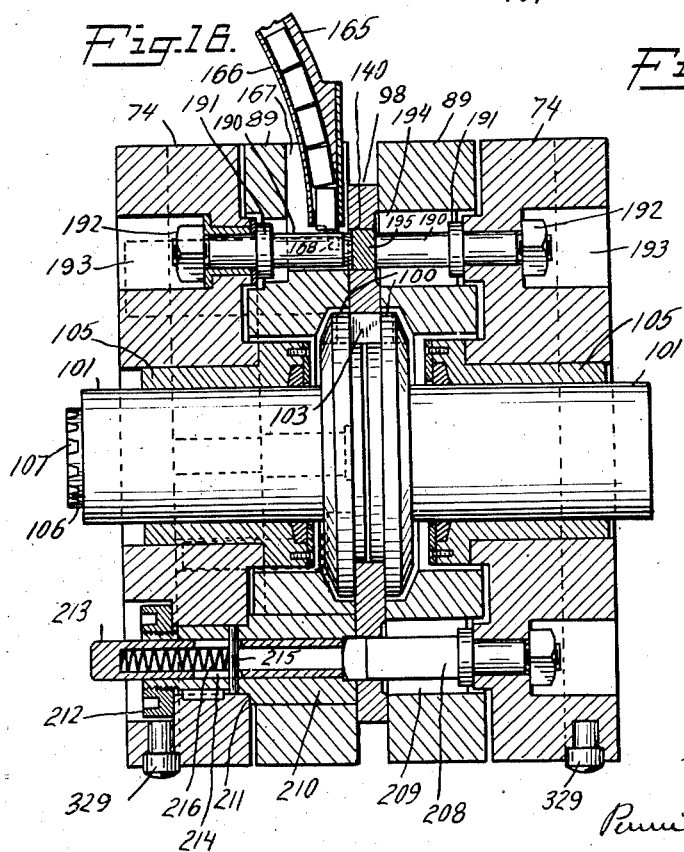
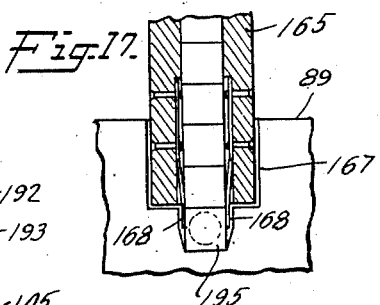
INVENTOR
S. W. Avis & M. H. Ames
BY
Pennie, Davis, Marvin & Edmonds
ATTORNEYS March 17, 1931.  S. W. AVIS ET AL  1,796,681
APPARATUS FOR MAKING NUTS
Filed June 23, 1928   13 Sheets-Sheet 10
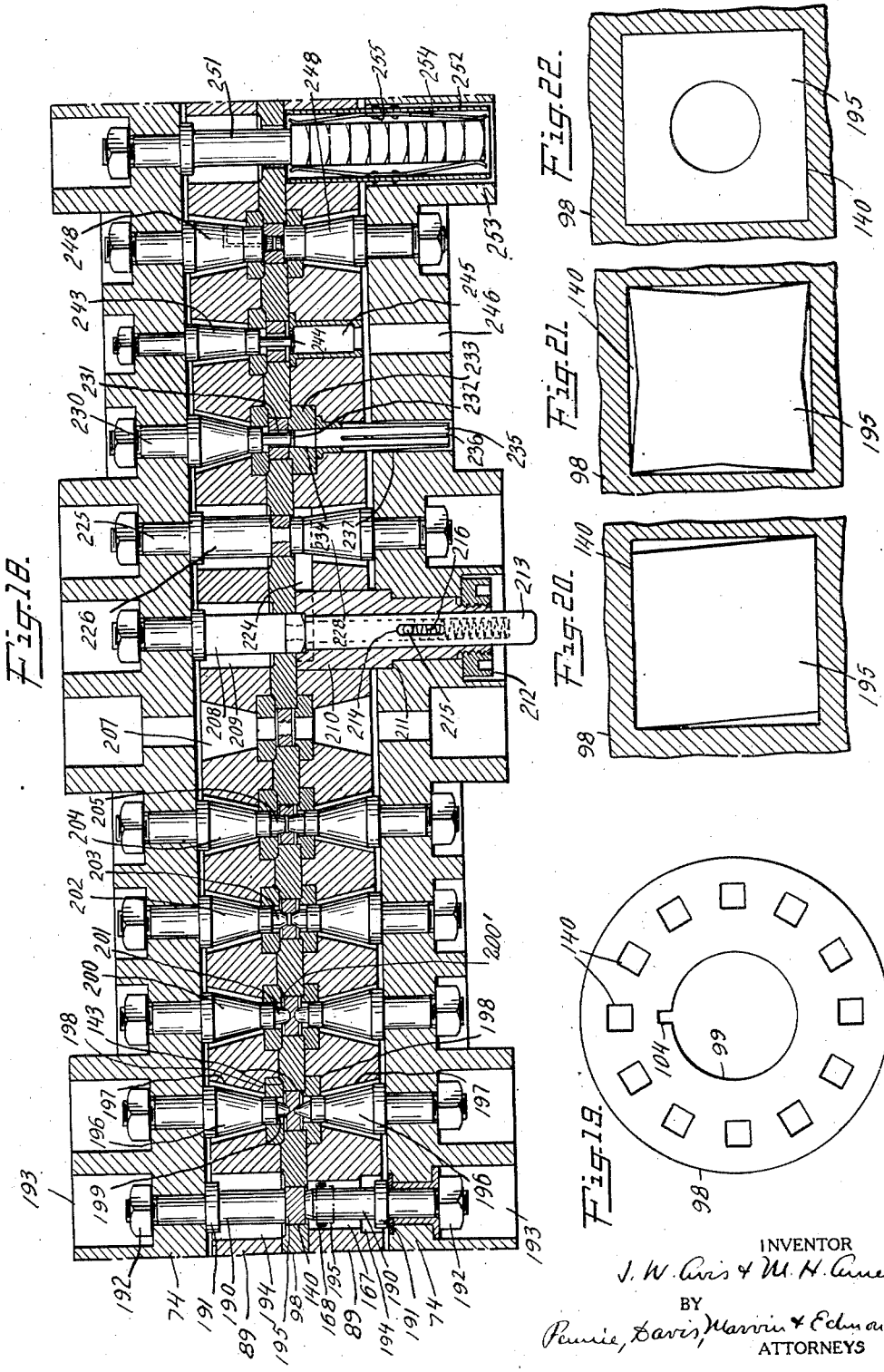

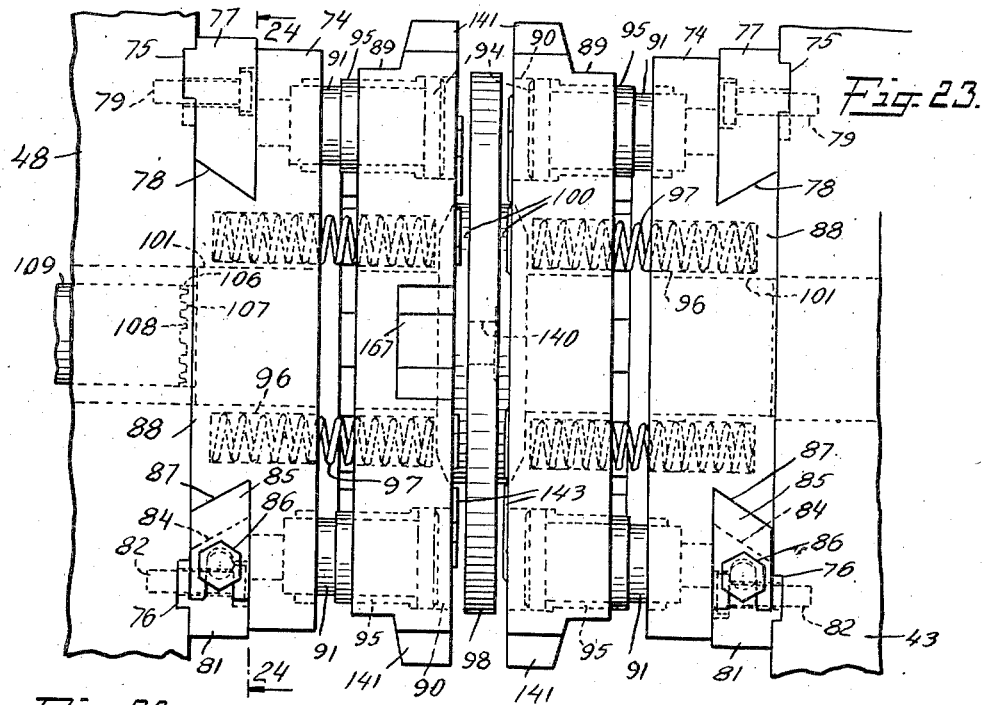
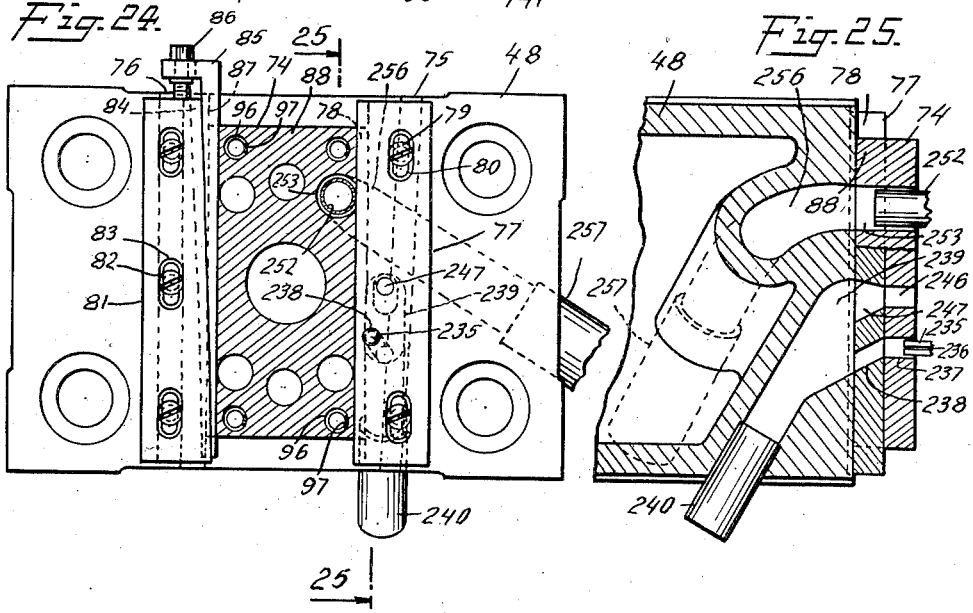

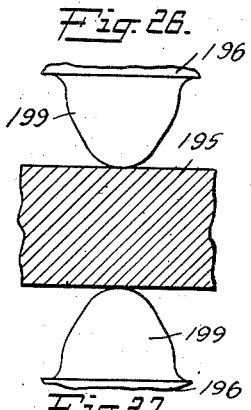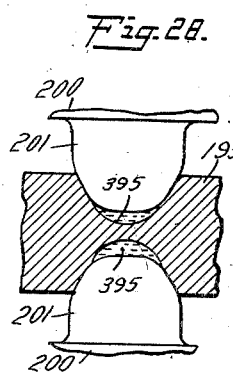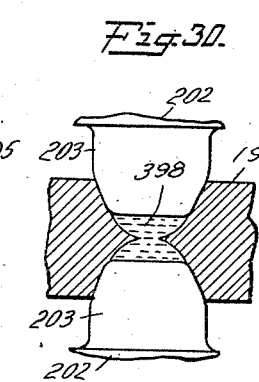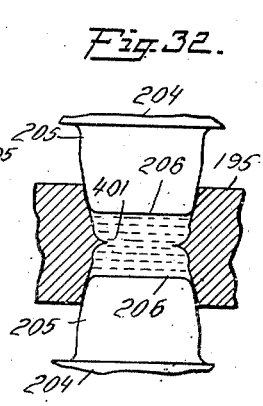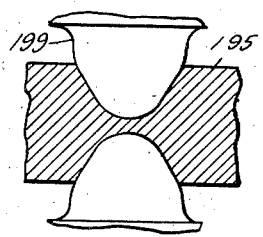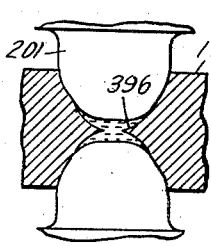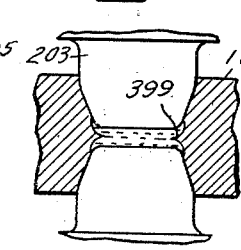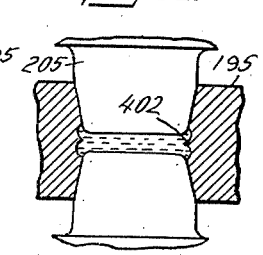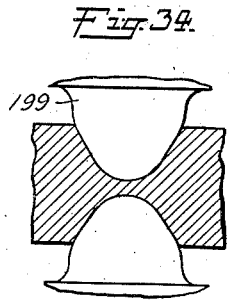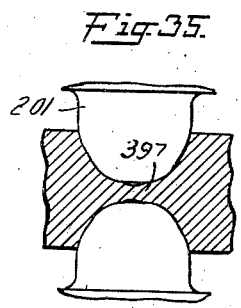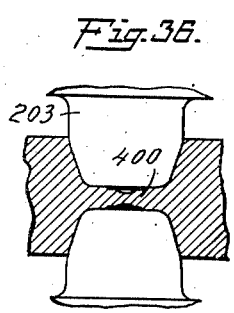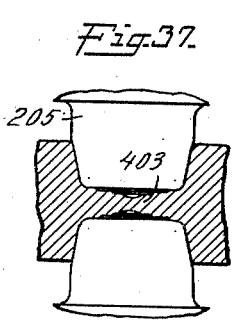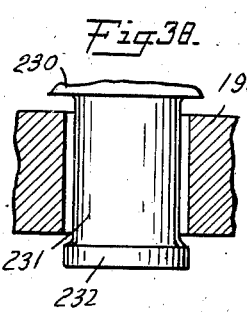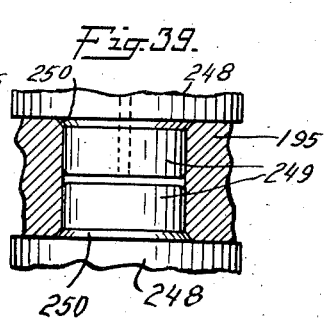

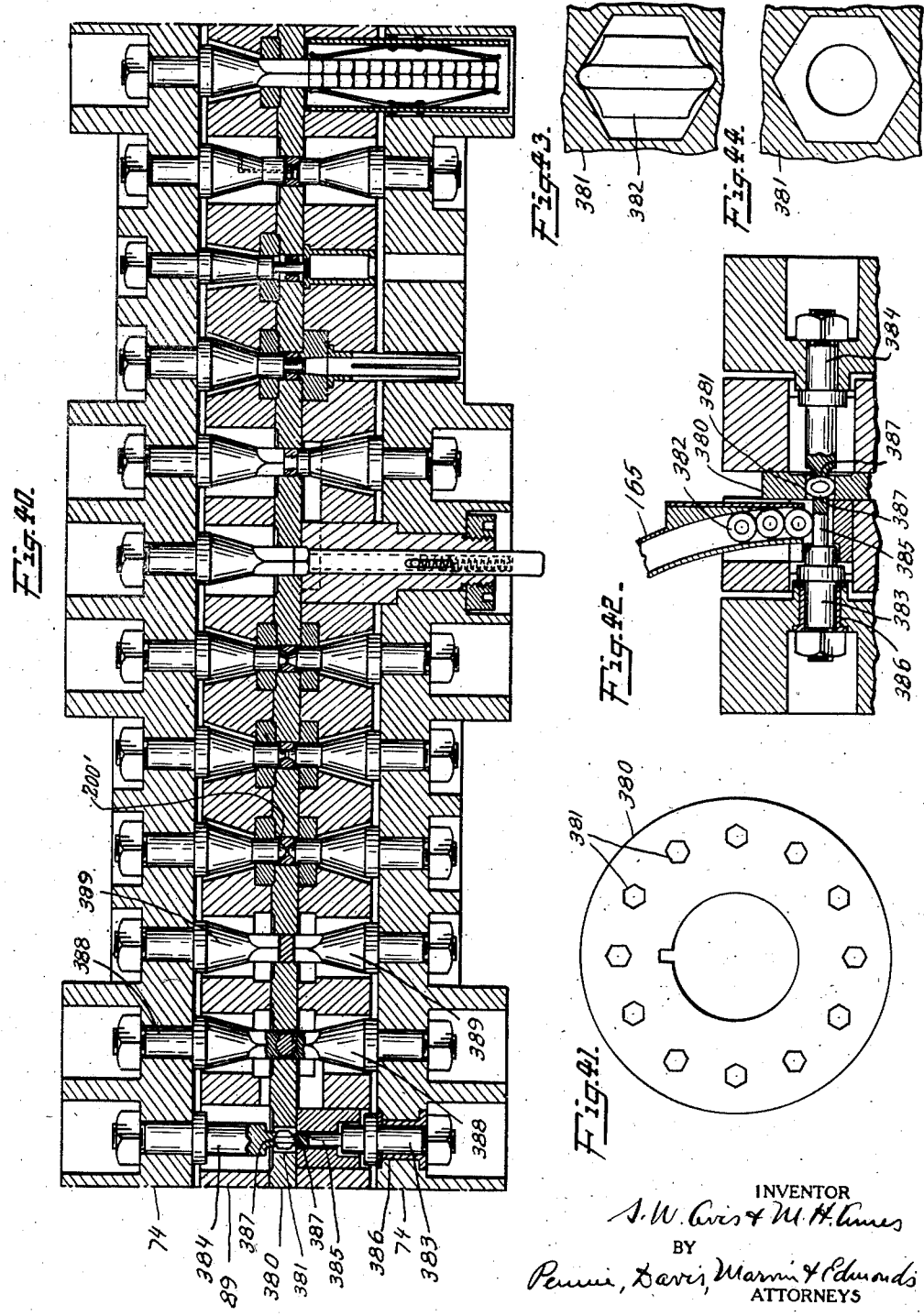

Patented Mar. 17, 1931

1,796,681

UNITED STATES PATENT OFFICE

SAMUEL W. AVIS, OF GREENWICH, CONNECTICUT, AND MALCOLM H. AMES, OF PORT CHESTER, NEW YORK, ASSIGNORS TO RUSSELL, BURDSALL & WARD BOLT & NUT COMPANY, OF PORT CHESTER, NEW YORK, A CORPORATION OF NEW YORK

APPARATUS FOR MAKING NUTS

Application filed June 23, 1928. Serial No. 287,828.

This invention relates to apparatus for forming nut blanks. In a copending application of Samuel W. Avis, Serial No. 287,795 filed June 23, 1928, there is described and claimed a process of making nut blanks by cold punching in which the volume of the blank is substantially equal to the volume of the finished nut. The apparatus herein described and claimed is particularly suitable for use in practicing the Avis process.

In the manufacture of nut blanks by the cold punch process now in use, the waste or scrap amounts to substantially 50 percent of the material. As more fully described in the Avis application, this waste can be substantially eliminated by forcing outwardly a metal blank of substantially the same volume as the volume of the finished nut to form the central opening of the nut, and produce a blank of the desired size. To carry out this operation on a commercial scale, it is necessary to form the central opening in a series of punching operations, and the present machine is designed for the purpose of performing this series of punching operations simultaneously on a plurality of blanks carried by a dial or other suitable supporting member, said dial having a step by step movement, whereby the production of the machine may compare favorably with the production of a machine of the prior art in which the central opening is formed in a single punching operation.

We accordingly provide a machine consisting of a dial having a plurality of die pockets, together with means for imparting a step by step motion to the dial. A tool holder and stripper block is arranged on each side of the dial and means are provided for reciprocating them to a closed position and to an open position. The dial driving means is synchronized with the reciprocating drive means to move the dial while the tool holders and stripper blocks are in open position. The tool holders are provided with a number of punches or other tools corresponding in number to the number of die pockets in the dial, so that at each closing of the tool holders, a separate operation may be performed on a nut blank in each pocket. Suitable means are provided for automatically feeding the blanks to the dial at the first station, the feeding mechanism being actuated upon each movement of the reciprocating parts of the machine to feed one blank, and means are provided for ejecting the finished blank from the dial.

The machine is also provided with suitable safety means for automatically disengaging the dial from the drive mechanism upon breakage of any of the punches, or displacement of the blanks from the die pockets together with means for returning the dial to its last operating position so that the dial pockets will be in alignment with the punches, and injury to the apparatus will be prevented.

In the accompanying drawings we have shown one form of the invention.

In the drawings:
Fig. 1 is a plan view;
Fig. 2 is a side elevation;
Fig. 3 is a vertical, sectional view on line 3—3 of Fig. 1 on an enlarged scale;
Fig. 4 is a plan view on the same scale as Fig. 3 with the top casting removed, and with parts broken away for clearness;
Fig. 5 is a vertical, sectional view on line 5—5 of Figs. 2 and 3 on the same scale as Fig. 3;
Fig. 6 is a vertical, sectional view on the line 6—6 of Figs. 2 and 3;
Fig. 7 is a side elevation of the conveyor for removing the finished nuts;
Fig. 8 is a detailed view of a feeding mechanism for the nut blanks and the locking mechanism therefor, showing the lock mechanism in closed position;
Fig. 9 is a front elevation of an index clutch and dial control;
Fig. 10 is a plan view of the index clutch, with parts shown in section;
Fig. 11 is a side elevation of the index clutch, parts being shown in section;
Fig. 12 is a vertical, sectional view on lines 12—12 of Figs. 9 and 10;
Fig. 13 is a front elevation of the tool block assembly;
Fig. 14 is a horizontal, sectional view on the lines 14—14 of Fig. 13;

Fig. 15 is a similar view on lines 15—15 of Fig. 13;

Fig. 16 is a vertical, sectional view on the lines 16—16 of Fig. 13;

Fig. 17 is a detailed view of a portion of the blank feeding mechanism;

Fig. 18 is a development of the tool block assembly showing the sequence of operations;

Fig. 19 is a front elevation of the dial;

Fig. 20 is a detailed view of a die pocket showing one form of blank at the beginning of the operation;

Fig. 21 is a similar view showing another form of blank;

Fig. 22 is a similar view showing a nut blank after the central opening has been formed;

Fig. 23 is a plan view of the tool block assembly with the parts in open position;

Fig. 24 is a sectional view on lines 24—24 of Fig. 23;

Fig. 25 is a detailed, sectional view on lines 25—25 of Fig. 24;

Figs. 26 to 33 are diagrammatic views showing various steps in the operation;

Figs. 34 to 37 are similar views showing the same steps with the punches unlubricated;

Figs. 38 and 39 are diagrammatic views illustrating the trimming operation and counter-sinking operation, respectively;

Fig. 40 is a development of the tool block assembly, similar to Fig. 18, showing the manufacture of hexagonal nuts;

Fig. 41 is a front elevation of the dial employed in the manufacture of hexagonal nuts;

Fig. 42 is a detailed view illustrating the feed of the blank into the tool block assembly in the manufacture of hexagonal nuts; and Figs. 43 and 44 are detailed views of dial pockets showing the blank at different steps in the manufacture of a hexagonal nut.

Figure 1:
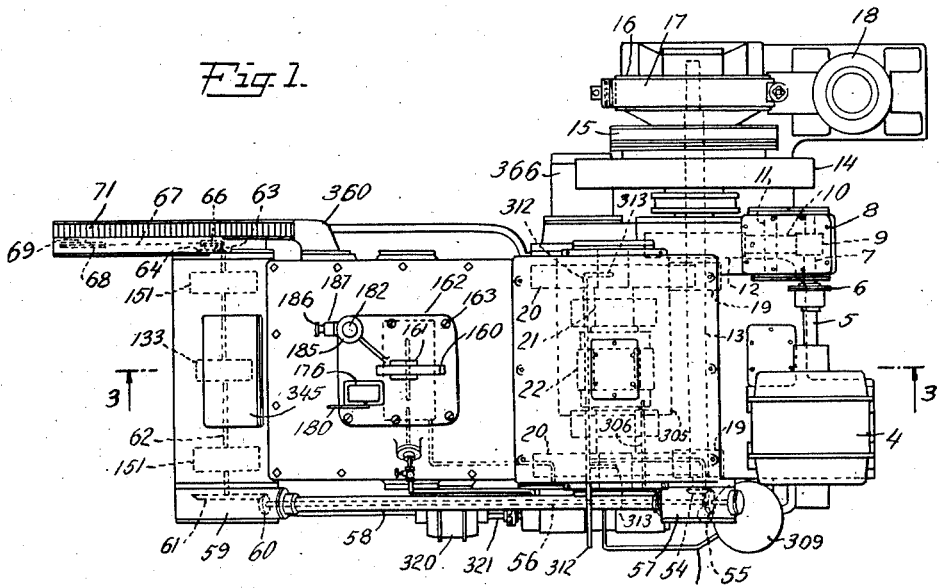

Referring to the drawings, the reference numeral 1 designates the lower portion of the main housing. The upper portion 2 is arranged over the lower portion of the housing and provided with a cover 3. The machine is driven by means of a motor 4 (see Fig. 1) arranged at one end of the machine and supported on the upper section 2 of the housing. The motor is provided with a motor shaft 5. The motor shaft 5 carries a coupling 6, connected to a stub shaft 7, mounted in a housing 8. A pinion 9 (see Fig. 2) is mounted on this stub shaft and drives an intermediate gear or pinion 10 mounted on an intermediate shaft 11. The gear 10 meshes with a gear 12 mounted on the main drive shaft 13. The drive shaft is provided with a fly wheel 14 and with an electric clutch 15 (see Fig. 1). A brake drum 16 is mounted on the shaft beyond the electric clutch and is adapted to be engaged by a brake band 17 controlled by a magnet or solenoid 18. The drive shaft 13 is also provided with a pair of pinions 19 each of which meshes with a gear 20 mounted on a crank shaft 21. The crank shaft 21 drives a crank arm 22 (see Fig. 3) which is connected to a vertical, reciprocating slide 23. This slide works in upper and lower guide members consisting of castings 24 and 25 carried by the upper and lower castings 2 and 1 respectively. The castings 24 and 25 may be provided with wear plates or facings 26 adapted to be engaged by the slide. Intermediate its ends the slide is provided with a rectangular opening for the reception of a pair of bearing blocks 28. These bearing blocks are adjustable by means of a wedge 29 having suitable adjusting means 30. Each side of the slide is provided with a pair of bearings 31 (see Fig. 4) adapted to receive a pin 33. A link 34 is carried by each of the pins 33. As shown, the link is provided with an opening adjacent its end for the reception of the pin and a bushing 32 which surrounds the pin. The end of the link is rounded and adapted to be received in a concave recess in the bearing block 28. One of the links 34 is connected to a rear slide 35 which is adapted to reciprocate on a suitable bed at right angles to the vertical slide 23. The bottom of the slide 35 engages a wear plate 36 and one side of the slide engages a portion of the housing. The other side engages a wedge-shaped wear plate 37, thus permitting adjustment and alignment of the slide. The face of the slide is recessed to receive a bearing block 38 having a concave face and the end of the link 34 is rounded to engage the face of the bearing block. This end of the link is provided with an opening adapted to receive a bushing 40. A pin 39 extends through the bushing 40 and is received in bearings in the side walls of the rear slide 35. The bearing block 38 is also provided with an adjusting wedge 41 having suitable adjusting means 42.

The other link 34 is similarly connected to a center slide 43 which is also recessed as hereinbefore described for the reception of a bearing block 44. The bearing block 44 is adjustable by means of a wedge 45 and wedge adjusting means 46. The bearing block 44 is shaped similar to the bearing block 38 and is also adapted to be engaged by the rounded end of the link 34. The link is also provided with an opening to receive a bushing in which is mounted a pin 47 which is received in bearings in the side walls of the center slide. By providing the bearing blocks 28, 38 and 44 the thrust of the drive from the vertical slide 23 to the rear slide 35 and center slide 43 is taken off the pins 33, 40 and 47 and transmitted through the bearing blocks and the links to the slides. The bearing blocks may be adjusted when necessary, through their respective wedges to retain the rounded ends of the links 34 in contact with the concave faces of the bearing blocks so that the thrust is conveyed through the bearing blocks to the slides.

A front slide 48 is connected to the rear slide 35 to reciprocate therewith. The center slide is provided with openings adjacent each corner (see Fig. 5) through which pass tie rods 49 and these tie rods are surrounded by tubes 50. These tubes enter openings in the front and rear slides and engage shoulders 51 formed by a reduction in the size of the opening. The rods extend through the reduced portion of the openings as indicated at 52 in Fig. 4 of the drawings and are provided with nuts 53 on their ends. The front and rear slides are thus tied together by the rods 49 and tubes 50. Before assembling the rods 49 are heated, and they are placed in the tubes 50 and tied together while still hot. The rods contract on cooling and the tubes are thus placed under an initial compression equal to the force applied to the punches carried by the slides.

The main drive shaft 13 is also provided with a bevel gear 54 (see Fig. 2) meshing with a bevel gear 55 on a shaft 56. The end of the main shaft and the gears 54 and 55 are mounted in a housing 57. The shaft 56 extends downwardly at an angle through a housing 58 into a housing 59 at the front of the machine. The lower end of shaft 56 is provided with a bevel gear 60 meshing with a bevel gear 61 mounted on a cam shaft 62. The opposite end of the shaft 62 is provided with a pinion 63 meshing with a gear 64 on a shaft 65 (see Fig. 4). This shaft carries a sprocket wheel 66 over which travels a sprocket chain 67 passing over another sprocket wheel 68 on a shaft 69 (see Fig. 7). The shaft 69 carries another sprocket wheel 70 over which passes an endless conveyor belt 71. A second sprocket wheel 72 is carried by a shaft 73 and the belt passes over this sprocket wheel.

The center slide 43 and the front slide 48 are provided with tool holders 74. The tool holders are mounted on the slides by means of a tongue and groove and are capable of being adjusted to properly center them. As shown, the face of the slide is provided with an inclined keyway 75 on one side and with a vertical keyway 76 on the opposite side (see Fig. 24). The inclined keyway is adapted to receive a holding member 77 having one inclined face 78 and adapted to be secured to the face of the slide by bolts 79 received in elongated slots 80 in the holding member. The other holding member 81 is likewise secured by bolts 82 passing through elongated slots 83, and is provided with an inclined surface 84. A wedge-shaped key 85 is arranged on the inclined face 84 of this key and is capable of being adjusted by means of an adjusting screw 86. The outer face 87 of this wedge cooperates with the inclined face 78 of the guide member 77 to form a dove-tailed groove adapted to receive a dove-tailed tongue 88 on the back of the tool holder.

A stripper block 89 is mounted in front of each of the tool holders. Each of the stripper blocks is provided with a plurality of concentric openings 90, preferably four in number, and a supporting stud 91 (see Fig. 15) passes through each of these openings and is received in an aligned opening in the tool holder. The end of the stud is reduced and threaded as at 92 and is adapted to engage internal threads in the reduced end portion of the opening in the tool holder. A stud screw 93 retains the stud in position and permits its adjustment to regulate the movement of the stripper block with respect to the tool holder. The outer end of the stud is provided with a head 94 of substantially the same diameter as the opening in the stripper block. A sleeve 95 surrounds a portion of the stud and is adapted to be engaged by head 94 to control the relative movement of the stripper block and tool holder. The adjacent faces of the stripper block and tool holder are also provided with recesses 96 for the reception of coil springs 97 which tend to move the tool holder and stripper block away from each other.

Figure 14:
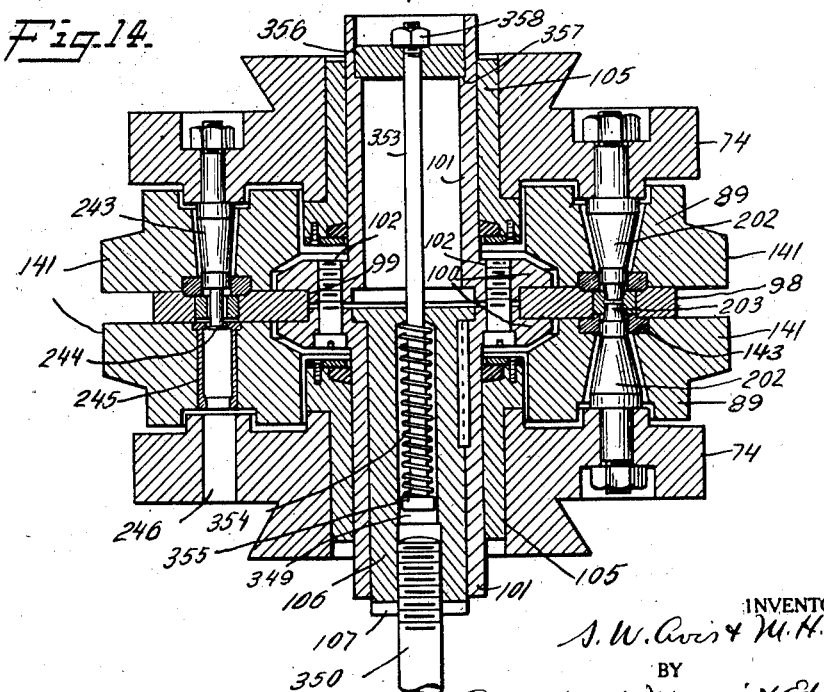

A dial 98 is arranged between the pair of stripper blocks (see Fig. 16). The dial is provided with a central opening 99 and is adapted to be received in a groove formed by the adjacent faces of flanges 100 carried by sleeves 101, passing through the tool holders and stripper blocks. The flanged ends of the sleeves are secured to each other by bolts 102 (see Fig. 14) and a key 103 (see Fig. 16). This key is received in slots formed in the flanges 101 and a slot 104 in the dial. Each of the sleeves 101 is surrounded by a sleeve or bearing 105 which forms a support for the dial and sleeves 101. Within one of the sleeves 101 there is provided a clutch member 106 which is keyed thereto (see Fig. 14). The clutch member is provided with clutch teeth 107 on its outer end which are adapted to engage similar clutch teeth 108 on a second clutch member 109 (see Fig. 23). The clutch member 109 extends through the front slide and is connected to a sleeve 110 by means of a key 111 (see Fig. 12). Surrounding the sleeve 110 is a second sleeve 112 connected thereto by a key 113 and extending outwardly beyond it. This sleeve carries a disk 114 to which is riveted a ring 115. A hub is arranged between the disk 114 and ring 115. This hub carries a plurality of keys 116, which fasten the disk and ring to each other. The ring 115 is provided with a plurality of depressions 117 in its outer face. A ring 118 is mounted in front of the ring 115 and is bolted to a hub 119 by bolts 120. The hub 119 is provided with a sleeve 121 which abuts the outer end of the sleeve 110 and is free to revolve on the clutch member 109. The inner face of the ring 118 is provided with projections 122 which are adapted to be received in the depressions 117 to drive the ring 115 and associated parts and the clutch member 109 under normal conditions. The projections 122 are normally retained in the depressions 117 by a coil spring 123 which surrounds the sleeve 110 and one end of which bears against the rear end of the sleeve 112. The other end of the coil spring 123 engages a washer 124 which abuts against the wall of a bearing 125 carried by a supporting casting 126. The bearing member 125 carries a bearing sleeve 127 which is engaged by the revolving sleeve 112. Adjacent the rear of the bearing member 125 the clutch member 109 is provided with an enlargement 128 and a bearing disk 129 is arranged between the bearing member 125 and this enlargement. The outer end of the clutch member is reduced in cross-section and threaded for the reception of a nut 130.

The outer face of the ring 118 is provided with a plurality of spaced concentrically arranged pins 131 carrying rollers 132. These rollers cooperate with a drive wheel or cam 133 carried by the shaft 62 (see Fig. 4). As shown the cam 133 is provided with a thread 134 which extends in the same vertical plane throughout the greater portion of the circumference of the cam and is then offset as at 135, so that the ring 118 and its associated parts will be moved the distance between two of the rollers 132 upon each revolution of the shaft 62 to impart a step by step movement to the ring 118.

Figure 13:
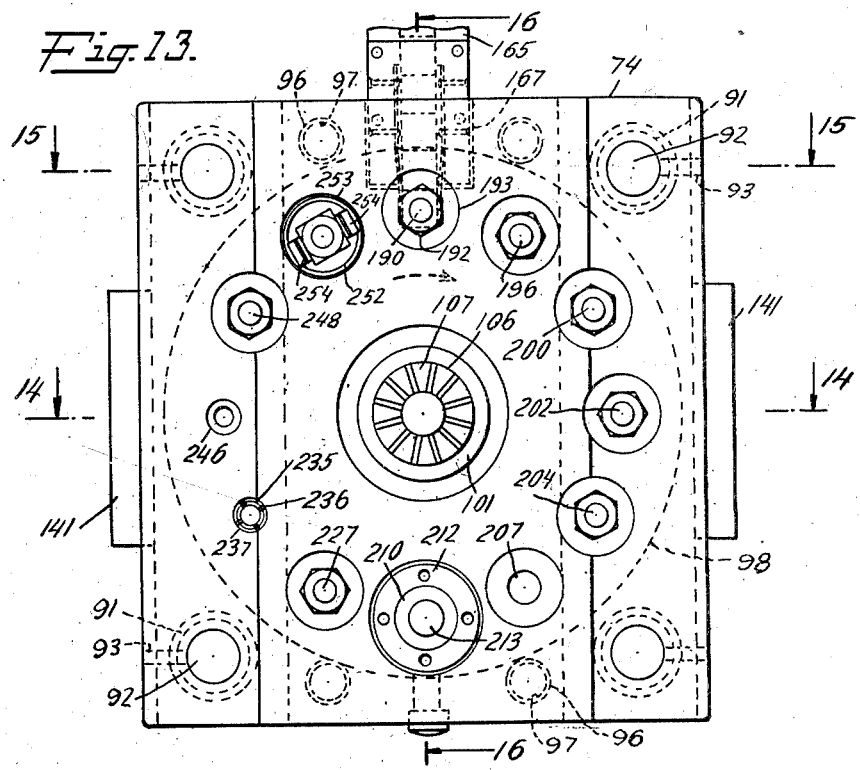

The step by step movement of the ring 118 and the associated clutch member 109 is transmitted through the clutch member 106 to the dial 98 to successively bring each of the dial openings into position for successive operations. As shown, the dial is provided with a plurality of openings or pockets 140 and the stripper blocks and tool holders are provided with openings in alignment with the openings 140. At each operation the dial moves a fraction of a revolution. With the parts in the position shown in Figs. 3 and 4 of the drawings, the dial is prevented from moving. As shown, the stripper blocks are provided with ears 141 (see Figs. 6 and 13) adapted to be engaged by stripper locks 142 (see Fig. 4) to retain them in engagement with the opposite faces of the dial. The faces of the stripper blocks are provided with projections 143 (see Figs. 14, 18 and 23) adapted to enter the openings 140 in the dial to prevent revolution of the dial when the stripper blocks are in closed position. A sleeve 144 is keyed to each of the stripper locks by pins 145 (see Fig. 4) and each of these sleeves is provided with a plate 146 adapted to be engaged by the head 147 of a pivoted arm 148. The other end of the arm carries a roller 149 received in the groove 150 of a cam 151 mounted on a shaft 62. The outward movement of the arm 148 positively moves the sleeve 144 to release the stripper lock 142. Within the sleeve 144 there is arranged a second sleeve 152 and a coil spring 153 is arranged between this sleeve and the bottom of the stripper lock. When the stripper lock is to be moved inwardly the movement of the arm 148 is conveyed to it through the sleeve 152 and the spring 153 thereby producing a yielding movement of the stripper lock which will permit the stripper lock to give if the stripper blocks have not yet completed their inward movement.

The blanks are fed to the dial by means of a chute 160, arranged on top of the machine, carried by an arm or bracket 161 supported on a cover plate 162 (see Fig. 3). The cover plate is secured to the top casting 2 by means of bolts 163. Beneath the cover plate there is provided a casting 164 forming a support for the upper end of an arcuate chute 165 which is U-shaped in cross section and the open side of which is closed by a plate 166. This chute extends into a recess 167 in one of the stripper blocks (see Figs. 16 and 23). Adjacent the lower end of the chute 165 a pair of spring fingers 168 are riveted to the side walls and are adapted to engage the sides of the blanks to prevent unrestricted flow of the blanks through the chute (see Fig. 17). The blanks are forced downwardly in the chute by a hammer 169 which is pivotally mounted on a rod or pin 170 (see Figs. 6 and 8), carried by a bracket 171 arranged on the under side of the cover plate 162. The hammer 169 is adapted to be moved forwardly by a coil spring 172 which surrounds the rod 170 and has one end secured to the rod and the other end secured to the bracket 171. The hammer 169 is adapted to be retained in inoperative position by a lug 173 carried by the front slide 48 and engaging an extension 174 on the lower end of the hammer (see Fig. 3). When the front slide moves outwardly the lug 173 is disengaged from the extension 174 and the hammer is moved forwardly by the tension of the spring 172. On its forward movement, it enters the upper end of the arcuate chute 165, and forces the blanks downwardly a distance equal to the width of one of the blanks, thus causing the fingers 168 to release the blank at the bottom of the chute.

Means are provided for locking the blank feeding mechanism to prevent further feeding of the nut blanks when the cover plate 162 is removed. As shown the rod 170 carries an arm 175 on the end opposite the coil spring and this arm projects through a slot in the cover plate into a housing 176. A shaft 177 is mounted in the wall of the housing and carries a crank arm 178 which has a pin 179 on its outer end. This pin is adapted to engage the arm 175 to retain the feeding hammer in an inoperative position when the parts are arranged as shown in Fig. 8 of the drawings. By rotating the shaft a half revolution, the crank arm 178 is moved out of the path of the arm 175. The shaft 177 projects through the wall of the housing and is provided with an operating handle 180. The lower end of the operating handle is provided with a pair of inclined surfaces 181 which engage the top of the cover plate 162 when the handle is in either of its two positions. As shown in Fig. 8 of the drawings, with the parts in the locked position, the center line of the operating handle extends below the point of engagement between the pin 179 and the arm 175. The action of the spring 172, with the parts in this position, tends to move the crank arm 178 in a clockwise direction and this movement is prevented by the engagement of the inclined surface 181 of the operating arm and the cover plate. Accidental release of the locking mechanism is thus prevented.

The top casting 2 forms a support for a vertical rod or post 182 provided with a lower notch or recess 183 and an upper recess 184 (see Figs. 3 and 6). The cover plate 162 is provided with a boss 185 having a central opening for the passage of the rod 182. On the side of this boss there is mounted a spring pressed pin 186 extending through a socket 187. A coil spring 188 is mounted in the socket 187. This opening normally retains the pin 186 in the lower recess 183 of the post 182. When the bolts 163 are removed from the cover plate, the pin 186 may be withdrawn from the recess 183, against the tension of the spring 188, and the cover plate raised until the pin 186 enters the upper recess 184. The cover will then be retained in raised position and can be swung around the post 182 as a center to permit freer access to the interior of the machine.

When the nut blanks are delivered from the lower end of the arcuate chute 165 they enter the lower portion of the recess 167 in one of the stripper blocks in alignment with one of the openings 140 in the dial. As shown in the development in Fig. 18, the tool holders are provided with punches 190 at this station and these punches have enlargements 191 which are adapted to engage the face of the tool holder on the side toward the dial. The stem of the punch passes through an opening in the tool holder and is provided with a threaded end portion to receive a nut 192 arranged in a recess 193 in the remote face of the tool holder. The stripper blocks are provided with openings 194 through which the punches 190 pass. The punch 190 on the side of the dial to which the blank is fed engages the blank 195 as it is delivered from the lower end of the chute 165. As the tool holder and stripper block close, the blank is forced into the opening 140 in the dial as shown in Fig. 16 of the drawings.

At the next station of the dial the first recess is made in each of the faces of the nut blank. At this station there is provided a pair of punches 196 which are carried in openings in the tool holder in the manner heretofore described in connection with the feed punches 190 and these punches extend through conical openings 197 in the stripper block. The faces of the stripper blocks adjacent the dial are provided with disks 198 surrounding the openings 197 and also provided with openings for the passage of the punches 196. These disks carry the projections 143 and serve as dowels to fasten the stripper blocks and dial together when the stripper blocks are closed. The ends of the punches 196 are provided with substantially cone shaped heads 199 which are adapted to enter the nut blank and force the metal outwardly toward the side wall of the pocket 140. Figs. 20 to 22 inclusive show the complete operation, one step of which is performed by the punches 196.

At the next station the tool holders are provided with punches 200 substantially similar to the punches 196 and mounted in the tool holder in the same manner. These punches pass through similar openings in the stripper blocks and are provided with heads 201 of more rounded contour which spread the metal to a greater extent than the heads 199 and thus progress another step toward the formation of the center opening in the nut blank. Similar punches 202 are arranged at the next station, mounted in the tool holders and extending through openings in the stripper blocks in the manner heretofore described. The heads 203 of these punches are of greater cross sectional area than the heads 201 of the punches 200 and tend to force the metal still more toward the side walls of the pockets 140 and progressively form the central opening in the nut blank.

At the next station the tool holder is provided with punches 204 supported in the tool holder in the manner heretofore described and extending through similar openings in the stripper blocks. These punches are provided with heads 205 substantially equal in cross section to the size of the opening to be formed in the blank and provided with flat faces 206. The thickness of the dial and the corresponding height of the die pockets is greater than the height of the nut blank, either before, during or after recessing, so that the faces of the blank are always within the die pocket providing a space 200′ between the face of the nut blank and disk 198 into which the metal can flow. The contour of the heads of the recessing punches is such that the cylindrical portions adjacent the recessing portion do not contact with the faces of the nut blank and these faces are, therefore, unconfined throughout the recessing operation. The arrangement of the punches in pairs on opposite sides of the blank causes symmetrical displacement of the metal on each side of the median line of the blank, that is, on each side of a center line parallel to the upper and lower faces of the blank. The dial and tool holder may be provided with one or more blank stations 207 to permit the use of additional punches for other operations. The number of punching operations and the shape or contour of the heads of the punches may, of course, be varied. The function of the punches is to progressively force the metal outwardly to form the center opening and shape the blank to fill the dial pocket as shown in Fig. 22 of the drawings. The distance that each punch enters the blank is determined by the length of the punch.

At the next station the nut blank is cupped, and on one side of the dial the tool holder carries a punch 208 which extends through an opening 209 in the stripper block and projects into the dial pocket when the tool holders and stripper blocks are in closed position. This partially removes the blank from the pocket as shown in Fig. 18 of the drawings and forces it against a cupping die 210 which is carried by the other tool holder. The cupping die extends through an opening in the stripper block into the tool holder and is provided with a shoulder 211 engaging an internal shoulder formed in the opening in the tool holder. The rear end of the die is threaded for the reception of a nut 212 which secures it in position. The cupping die is also provided with a central opening for the reception of an ejector rod 213. The ejector rod is provided with an elongated slot 214 adapted to receive a pin 215 mounted in the cupping die and the pin engages one end of a coil spring 216 mounted in a recess in the ejector rod. The casting 126 is provided with an opening adapted to receive the reduced end 217 of a rod 218 (see Fig. 12). This reduced end is threaded for the reception of a nut 219 which cooperates with a shoulder 220 formed at the inner end of the reduced end 217 to secure the rod to the casting. The opposite end of this rod is provided with an enlarged head 221 passing through a bearing sleeve 222 formed in the front slide and contacting with the outer end of the ejector 213. After the nut has been cupped and the stripper blocks and tool holders start to move toward an open position the ejector 213 is prevented from moving by the rod 218 and the nut is thus ejected from the cupping die. The spring 216 holds the ejector against the rod 218 at all times. Between this station and the next station the stripper block is provided with a groove or recess 224 to provide clearance for the passage of the nut from the cupping station to the next station.

At the next station the blank is returned to its proper position within the dial. At this station one of the tool holders is provided with a punch 225 having a cylindrical head 226 which serves as a stop and the other tool holder is provided with a punch 227 having a head 228 which is adapted to return the nut blank from its position partially within the groove 224 to the pocket 140 in the dial and flatten the blank to its proper thickness.

At the next station the center opening in the blank is trimmed. One of the tool holders is provided with a punch 230 having a reduced end 231 of slightly less cross sectional area than the size of the opening. The extreme end of the punch is enlarged as at 232 to a diameter equal to the diameter of the desired opening in the nut, and, as shown in Figs. 18 and 38, this punch is of sufficient length to extend through the nut blank to the opposite face of the dial when the tool holder is in closed position. On the opposite side of the dial the stripper block is provided with a bearing member 233 having a tapered central opening 234 into which the enlarged head 232 of the punch extends. This opening is tapered to allow expansion of the scrap trimmed from the nut blank and prevent it from being carried back into the blank by the punch. Extending through the stripper block and the tool holder are aligned openings 237 adapted to receive a tube 235 for the scrap trimmed from the nut. This tube is provided with a plurality of longitudinally extending slots 236 and the slotted portion of the tube acts as springs to keep the rings of scrap advancing in an upright position.

As shown in Figs. 24 and 25, the opening 237 in the tool holder 74 communicates with an opening 238 in the tongue 77. The front slide 48 is provided with an oval opening 239 registering with the opening 238 and extending at an incline through the slide. A pipe or tube 240 is arranged in the lower end of this opening and is adapted to deliver the scrap to a container 241 supported on the lower casting 1 of the machine (see Fig. 3). The bottom of this container is provided with perforations 242.

The next station is provided as a safety station in case of breakage of the end 231 of the punch 230 during the trimming operation. As shown, this station is provided with a punch 243 carried by one of the tool holders and having an end portion 244. The end portion 244 is adapted to extend through the opening in the nut blank when the tool holders and stripper blocks are closed and is slightly smaller in diameter than the opening in the blank. On the opposite side the stripper block and tool holder are provided with openings 245 and 246 respectively through which a broken punch, or any of the scrap trimmed from the blank at the preceding station and not ejected, may pass to an opening 247 in the tongue 77 and thence to the upper end of the oval opening 239 in the front slide 48. From here the scrap follows the same path as from the preceding station to the receptacle 241.

At the next station a counter-sinking operation is performed. Each of the tool holders is provided with punches 248 secured in the tool holders in the manner heretofore described and extending through openings in the stripper blocks. The heads of the counter-sinking punches are shown on an enlarged scale in Fig. 39 of the drawings. As shown in this view, each of the punches is provided with a head 249 of the same diameter as the central opening in the nut blank and of slightly less diameter than the adjacent portion of the punch. These heads are connected to the body portion by inclined or beveled portions 250 which engage the nut blank at the ends of the openings to force the metal away from the ends of the openings and form the counter-sinking. The heads 249 are provided for the purpose of preventing the metal which is forced to move in the counter-sinking operation from moving into the central opening of the blank and cause it to move toward the side walls of the pockets. The counter-sinking of the ends of the central opening in the nut blank facilitates the later threading of the blank for the purpose of producing a finished nut.

At the next station, one of the tool holders is provided with a punch 251 which is of sufficient length to extend through the dial, when the tool holders and stripper blocks are in closed position, and force the nut from the dial pocket. The stripper block is provided with an opening in alignment therewith which is adapted to receive a tube 252 shown in Figs. 13 and 18 of the drawings. This tube extends through an opening 253 in the tool holder. The opening 253 is of slightly larger diameter than the tube. On opposite sides of the tube, springs 254 are secured to the inner wall by rivets 255 and the ends of these springs extend toward each other a sufficient distance to frictionally engage the opposite sides of the nut blanks. When sufficient blanks have passed through the machine to fill the tube, as shown in Fig. 18 of the drawings, the operation of the punch 251 forces the blanks to move through the tube against the tension of the springs and one of the nut blanks is delivered from the outer end of the tube into an opening or passage 256 in the front slide 48 (see Fig. 25). This passage inclines downwardly and communicates with a tube 257 that moves with the slide and passes through an elongated slot 258 in the bottom casting 1 of the machine (see Fig. 4).

The outer end of the tube registers with an elongated opening 259 in a housing 260 mounted on the side of the machine and the blank is delivered through this housing to one of the pockets of the conveyor 71. The blanks are carried upwardly in the pockets of the conveyor to the top and delivered to a chute 261.

Means are provided for returning the dial to its last station, in case of the breakage of a punch or the displacement of one of the blanks from the pocket 140, to prevent the tool holders and stripper blocks from closing and thus causing damage or breakage to the dial or punches. The supporting casting 126 carries a ring 270 (see Figs. 9 to 12) which is supported by a pair of rollers 271 and by a plate 272 carried by a lug or post 273 mounted on the casting 126. This ring is provided with an internal arcuate recess 274 for the reception of a coil spring 275. One end of this spring bears against a post 276 carried by the supporting casting 126. The opposite end of the spring engages a shoulder 277 formed at the end of the recess 274. The ring 270 is provided with a shoulder 278 adapted to be engaged by slide 279 mounted in a housing 280 carried by the casting 126. This slide is normally spring pressed into engagement with the shoulder 278 by a coil spring 281 carried in a recess in the rear end of the slide 279 and engaging the back of the housing 280.

If the dial binds due to displacement of a nut blank from one of the pockets, or due to the breakage of a punch, or due to improper removal of the head 231 of the trimming punch after a breakage, the projections 122 carried by the ring 118 ride out of the depressions 117 in the ring 116. As the ring 118 is incapable of lateral movement due to the engagement of its hub 121 with the end of the sleeve 110, the ring 115, ring 116, disk 114 and hub 112 are moved back against the tension of the spring 123. During this movement, the disk 114 engages a roller 285 carried by a lever 286 pivotally mounted on the casting 126 and this lever is connected by a pin 287 to one arm of a bell crank lever 288. The other arm of this bell crank lever projects into the housing 280 and enters a slot 289 in the slide 279. A pawl 290 is pivotally mounted on a pin 291 carried by the ring 270 and this pawl is provided with an extension 292 engaged by the slide 279. A coil spring 293 engages the opposite side of the extension 292 and is adapted to move the pawl to an operative position. The pawl is provided with a tooth 294 adapted to engage ratchet teeth 295 on the ring 115. When the bell crank lever 288 is actuated, the slide is moved backwardly into the housing against the tension of the spring 281 and disengages the shoulder 288. This permits the spring 275, which is under tension, to move the ring 270 in a counter clock-wise direction. At the same time, the movement of the slide frees the pawl 290, and the spring 293 causes the pawl to engage one of the ratchet teeth 295 on the ring 115, to prevent further movement of the dial and associated parts in a forward direction and to return dial to the initial position of the cycle through action of spring 275. A holding pawl 296 is provided on the supporting casting and is maintained in an operative position by a coil spring 297. This pawl is provided with a locking tooth 298 adapted to engage ratchet teeth 299 formed on the periphery of the disk 114. This pawl functions to stop the dial at the starting point of the cycle and align the die pockets with the punches and other tools.

Figure 2:
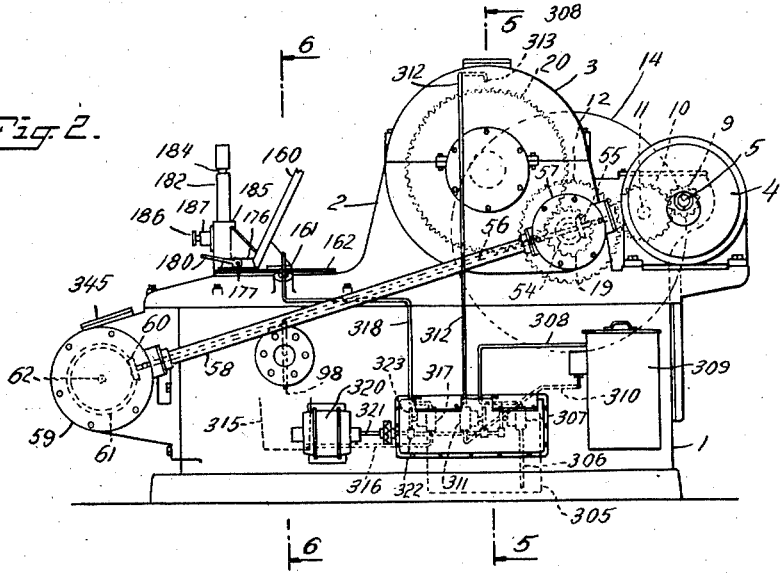

The operating parts of the machine are lubricated from a sump 305 (see Fig. 3) arranged at the bottom of the housing 1 from which oil is delivered through a pipe 306 to a pump 307 (see Fig. 2). The pump is provided with an outlet pipe 308 communicating with an oil filter 309. The oil filter is provided with an outlet pipe 310 communicating with a second pump 311 having an outlet pipe 312 which extends into the top of the machine and discharges as indicated at 313. Similar lubricating means may be connected to the front end of the machine for lubricating the cam shaft 62, the index clutch and associated parts. The oil from the pipe 313 lubricates the various gears, slides and bearings throughout the machine by the usual splash method and eventually returns by gravity to the sump 305 in the usual manner.

The dial and associated parts are lubricated by a separate oil system, special oil being employed for this purpose. Beneath the dial there is provided a container 315 (see Fig. 3) serving as a sump and connected to a pipe 316 which is connected to a pump 317 (see Fig. 4). The pump is provided with an outlet pipe 318 connected to a nozzle 319 arranged over the dial and adapted to deliver the oil to the dial and associated parts (see Fig. 6). The pumps are driven by a motor 320 having a motor shaft 321. This shaft is provided with pinions 322, meshing with gears 323 which drive the pumps 307, 311 and 317. The oil used for the dial and associated parts is prevented from mixing with the lubrication in the rest of the machine by suitable packing means. As shown U-shaped packing members 325 are carried by the inner faces of the center slide 44 and the front slide 48 (see Figs. 3 and 6). These U-shaped members extend across the bottom and the two sides of the slides. At the top the front slide is engaged by a packing strip 326 carried by the casting 2 and the center slide is engaged by a somewhat similar packing strip 327 supported on a bracket 328 carried by the casting 2. The tool holders 74 are provided with pins 329 which rest upon wear plates 330 carried by the base of the U-shaped packing members.

Means are provided for de-energizing the motors upon disengagement of the index clutch. As shown (see Figs. 9 and 10), a pin 340 is carried by the slide 279 and projects through a slot 341 in the housing 280. The end of this pin rides in a slot in a crank arm 342 and this arm is carried by a shaft 343. The shaft 343 projects through the end wall of the lower casting and controls an electric switch 344 (see Fig. 4). When the slide is reciprocated in the housing the shaft 343 is rotated, opening the switch 344 and disconnecting the motors 4 and 320. The switch 344 also controls the electric clutch 15 and de-energizes the solenoid 18 to apply the brake band 17 to the brake drum 16.

Access may be had to the interior of the front end of the machine through a removable cover plate 345 to reset the index clutch. As shown, the ring 270 is provided with a boss 346 having a socket 347 for the reception of a suitable operating handle or tool to permit the ring to be turned in a clockwise direction against the tension of the spring 275 until the shoulder 278 passes the slide 279 when the slide will be projected by the spring 281 to engage the shoulder 278 and release the pawl 290.

The removal of the cover plate 345 also permits access to the means for retaining the dial 98 and the sleeves 101 in assembled position. As shown, (see Fig. 14) the clutch member 106 is provided with a central opening 349 adapted to receive the threaded end of a rod 350 which extends through a central opening in the clutch member 109 and is provided with an enlargement 351 adjacent its outer end adapted to engage a shoulder formed adjacent the end of this opening (see Fig. 12). Beyond the enlargement the rod is provided with a head 352 for the reception of a suitable tool by means of which the threaded end of the rod may be released to disassemble the dial and its associated parts. The sleeve 101 on the opposite side of the dial is connected to the clutch member 106 by means of a rod 353 which extends through a reduced portion of the central opening 349 in the clutch member 106 and is surrounded by a coil spring 354. One end of this spring engages a shoulder formed by the reduction of the opening and the other end engages a nut or head 355 on the end of the rod 353. The other end of the rod passes through a retaining block 356 arranged within the sleeve 101 and engaging a shoulder 357 in the sleeve to limit its inward movement. Rod 353 and spring 354 are provided to permit an end chase of about 1/32" to the dial to insure equalized clamping of the dial between the stripper blocks. When the rod 350 is released, the clutch teeth 107 and 108 may be disengaged and the dial and associated parts may be removed by unfastening the tool holders from the front and outer slides in the manner heretofore described. When the slides are opened, the end of the sleeves 101 are within the space between the slides, and the entire assembly may be removed through the opening normally closed by the cover plate 162. The dial may be removed from the assembly by loosening nut 358 and removing the rod 353.

A link 360 may be connected to the bottom of the vertical slide 23 and this link is connected to a bell crank lever 361 pivotally mounted as at 362 in a bracket 363 carried by the lower casting. The other end of the bell crank lever is connected to the connecting rod 364 of a piston 365 which is mounted in a cylinder 366 arranged on the casting 1. The cylinder is provided with a plurality of air ports 367 arranged at a distance from the head of the cylinder so that the outward movement of the piston will trap a body of air in the cylinder and cushion the movement of the slides. The piston may be provided with a water jacket 368 having an inlet pipe 369 and an outlet pipe 370 for cooling it. This mechanism serves to store up the unused energy of the upstroke and give it off on the down stroke, thereby adding to the power of the down or working stroke. This results in considerable gain in machine efficiency and higher speed is attained.

On the outward movement of the front slide 48 the nuts 53 on the ends of the tie rods move to a point beyond the vertical plane of the supporting casting 126. The casting is provided with openings through which the ends of the rods and the nuts pass and these openings are provided with cover members 371 which are substantially cup-shaped and the bottoms of which are spaced from the supporting casting 126. These cover plates may be secured in position by bolts 372 passing through aligned openings in ears 373 of the cover plates into openings in the casting. These cover plates prevent the oil used in lubricating the dial and its associated parts from entering the housing of the cam shaft 62 and mixing with the lubricating oil employed in this portion of the machine.

In Figs. 40 to 44 of the drawings, we have shown the development of a dial and associated parts used in forming the hexagonal nut blanks. As shown, the dial 380 is provided with pockets 381 of hexagonal shape but is in other respects similar to the dial 98 shown in Fig. 19 of the drawings. The pockets of the dial may be shaped to form a nut of any desired contour.

In forming hexagonal nut blanks, the blanks may be of any desired shape having a volume substantially equal to the volume of the finished nut, but as shown in Fig. 43 of the drawings, we preferably employ buttons 382 formed by mashing or squeezing a wire, the cross-sectional area of which is equal to the area of one side of the finished nut. The portion of the dial, tool holders and stripper blocks to the right of Fig. 40 of the drawings is substantially the same in construction as the corresponding parts of Fig. 18 of the drawings and the same reference numerals are used to designate them. At the left of the drawing, representing the first few stations in the manufacture of a hexagonal nut, several additional punches are added for the purpose of squeezing and flattening the disks 382. As shown, the tool holders are provided with punches 383 and 384 at the first station, one of which is provided with a reduced stem 385. The punch 383 having the reduced stem 385 is mounted in a bushing or sleeve 386 in the tool holder. Each of these punches is provided with concave faces 387 which are adapted to engage the blank on opposite sides and, when the tool holders move inwardly, the ends of these punches enter the dial pocket 381. The blank is carried into the dial pocket by the reduced stem 385 of the punch 383 and given an initial squeezing by the two punches to spread the blank and cause it to contact with the walls of the die pocket on opposite sides to retain it in the pocket.

At the next station we provide punches 388 which perform a second squeezing operation and which are of the proper length to extend slightly into the dial pocket when the tool holders are in closed position. These punches prepare the blank for the flattening operation by causing the metal to assume such position that the flattening operation may be readily carried out. The third station is provided with punches 389 which flatten the blank. It is then ready for the recessing punches which act upon the blank in the manner heretofore described in connection with Fig. 18 of the drawings.

In operation, the reciprocation of the vertical slide 23 reciprocates the rear slide 35 and the center slide 43 in opposite directions through the links 34. The provision of the bearing blocks 28, 38 and 44, together with the rounded ends of the links 34 distributes the thrust to the slides without placing an undue strain on the pivot pins 33, 41 and 47 and their bushings. The adjusting wedges provided for each of these bearing blocks permits wear to be taken up and the bearing blocks and link faces retained in contact with each other. The front slide 48, being connected to the rear slide 45 reciprocates in the opposite direction from the center slide 43 so that the front and center slides simultaneously move toward and away from the dial. Placing the tubes 50 under an initial compression permits the punch heads of each pair of punches to be reciprocated to positions in close proximity to each other and without danger of them extending beyond the desired limits of their stroke and strike each other. The force exerted on the punches may be determined, and by placing the tubes under the same amount of compression, they will not give until this force is exceeded. The tool holders 74 and the stripper blocks 89 are carried by the front and center slides so that upon each complete stroke of the slides the stripper blocks and tool holders alternately move toward the dial to the position shown in Fig. 3 of the drawings and away from the dial to the position shown in Fig. 23 of the drawings. When the tool holders and stripper blocks are in closed position the coil springs 97 are compressed and the projections 143 on the dowels 198 enter the dial pockets 140 and lock the dial against rotation with the dial pocket registering with the punches and openings in the stripper blocks. In moving from the open position shown in Fig. 23 of the drawings, the slides, tool holders and stripper blocks move as a unit until the stripper blocks contact with the opposite faces of the dial when the dial is locked against further rotation in the manner heretofore described. The stripper locks 142 then engage the ears 141 of the stripper blocks to lock them in closed position and the slides and tool holders continue to move inwardly placing the springs 97 under compression and moving the heads 94 of the studs 91 away from the sleeves 95 as shown in Fig. 15 of the drawings. During this latter movement, the various punches perform the operations on the blanks in the respective pockets of the dial, as previously described in connection with Figs. 18 and 40 of the drawings. After the punching operations have been performed, the slides move away from the dial, the stripper blocks remaining stationary until the tool holders have moved a distance sufficient to permit the heads 94 of the studs 91 to engage the sleeves 95. During this initial movement of the slides and tool holders, the stripper locks are opened by the cams 150 and the stripper blocks then move away from the dial. While the parts are in the open position shown in Fig. 23 of the drawings, the dial is fed forwardly one step by the thread 134 on the wheel or cam 133, when the offset portion 135 of the thread passes between two of the rollers 132.

The release of the dial from the driving mechanism by the projections 122 riding out of the depressions 117 has heretofore been described. The operation of the safety spring 274, when the dial is released from its drive mechanism has also been described. By this operation, the dial is locked against further movement by the pawl 290.

Access to the various parts of the machine and removal of worn or damaged parts is easily obtained through the cover plates 162 and 245. The release of the clutch member 106 can be accomplished by loosening the rod 350 and the dial and associated parts can be removed by removing the tool holders from the slides. Access is obtained to the bolts 79 and 82 through the cover plate 161 and when the holding plates 77 and 81 have been removed, the entire tool holder assembly may be lifted from the machine. When the slides are in open position, the end of the sleeves 101 are within the space between the adjacent faces of the front and center slide.

Figs. 26 to 37 of the drawings represent an enlarged illustration of the development of the four recessing punches of Fig. 18 of the drawings with and without lubrication of the blank. Fig. 26 illustrates the position of the punch head 199 and the condition of the nut blank 195 at the start of the stroke. Fig. 27 illustrates the same parts at the end of the stroke with lubrication and Fig. 34 represents the position and condition of the parts at the end of the stroke without lubrication. The first operation is the same whether the parts are lubricated or not. When the punch head 199 is removed and the dial moves to carry the blank to the next station, the punch head 201 enters, as illustrated in Fig. 28 of the drawings. The recesses in the blank will contain a quantity of oil, if the dial and its associated parts are lubricated. Due to the difference in the contour of the head of the punch, it will assume the position shown in Fig. 28 of the drawings trapping a quantity of oil beneath the punch head as indicated at 395. As the punch head 201 enters the recess this oil is compressed, exerting hydraulic pressure and tending to force the metal of the blank outwardly toward the walls of the dial pocket which produces an opening in the blank as illustrated at 396 in Fig. 29 of the drawings. Some of the oil will seep out between the punch head and the wall of the recess but enough will be retained to exert the desired pressure. If lubrication is not employed in this operation, the metal at the middle of the opening will not be broken through but the recesses will be shaped substantially the same as the punch heads, as indicated at 397 in Fig. 35 of the drawings. In addition the compressed oil strips the punch heads from the walls of the recess at the beginning of the outward movement of the tool holders.

Fig. 30 of the drawings represents the condition when the punch heads 203 of the third set of punches, first enter the recess in the blank from each side. A body of oil 398 will be trapped between the punch heads. Further inward movement of the punch heads 203 compresses the oil, causing it to exert hydraulic pressure radially of the center of the opening and force the metal back toward the side walls as indicated at 399. In Fig. 36 of the drawings, the same operation is illustrated without lubrication and a relatively flat disk of metal 400 is shown at the bottom of each of the recesses separating them from each other.

Fig. 32 of the drawings represents the condition of and position of the parts when the next set of punch heads 205 have entered the recess a sufficient distance to close it and trap a body of oil 401 therein. The further inward movement of the punch heads 206 compresses this body of oil, as shown in Fig. 33 of the drawings causing it to exert hydraulic pressure in the manner heretofore described and eventually producing a recess extending entirely through the blank, the middle portion of which is shaped as indicated by the reference numeral 402. If lubrication is not employed, as shown in Fig. 37 of the drawings, the recesses from the opposite faces are not joined but are separated by a section of metal 403. It will be apparent that the use of lubrication during the punching operations materially reduces the waste removed during the trimming operation performed by the trimming punch 230. This reduces the strain placed on the stem 231 of the trimming punch and thus reduces the possibility of breakage. The compressed oil also assists in stripping the punches at the end of each operation, as heretofore described.

The slots in the tube 236 form spring fingers which retain the scrap in an upright position and prevent it from clogging the tube.

We claim:

1. Apparatus for forming nut blanks, comprising a carrier having a plurality of die pockets adapted to receive nut blanks in which a central opening is to be formed, a plurality of recessing punches arranged in pairs on opposite sides of said carrier and adapted to simultaneously act on a plurality of blanks in said die pockets, each punch of each pair entering the blank a distance less than one-half the thickness of the blank so that the metal will be displaced substantially symmetrically on each side of the median line of the blank, means for advancing said die pockets successively to positions between said pairs of recessing punches to submit each blank to successive recessing operations, and means for simultaneously reciprocating said recessing punches.

2. Apparatus for forming nut blanks comprising means for advancing a blank to a plurality of successive stations, recessing punches arranged at said stations on opposite sides of said blanks, means for reciprocating said punches and means for delivering oil to said punches whereby oil will be trapped beneath the heads of the punches in the recesses formed by the preceding punches and caused to exert hydraulic pressure in said recesses by said latter punches.

3. Apparatus for forming nut blanks comprising a carrier having a plurality of die pockets adapted to receive nut blanks in which a central opening is to be formed, a plurality of recessing punches arranged in pairs on opposite sides of said carrier, means for advancing said die pockets successively to positions between said pairs of punches, means for simultaneously reciprocating said punches, and means for delivering oil to said punches whereby oil will be trapped beneath the heads of the punches in the recesses formed by the preceding punches and caused to exert hydraulic pressure in said recesses by said latter punches.

4. Apparatus for forming nut blanks comprising a carrier having a plurality of die pockets adapted to receive nut blanks in which a central opening is to be formed, a plurality of recessing punches arranged in pairs on opposite sides of said carrier and adapted to simultaneously act on a plurality of blanks in said die pockets, each punch of each pair entering the blank a distance less than one-half the thickness of the blank so that the metal will be displaced substantially symmetrically on each side of the median line of the blank, a trim punch arranged on one side of said carrier beyond said recessing punches, means on the opposite side of said carrier in alignment with said trim punch for conveying scrap metal therefrom, means for advancing said die pockets successively to positions between said pairs of recessing punches and between said trim punch and said conveying means to submit each blank to successive recessing operations and said trimming operation, and means for simultaneously reciprocating said punches.

5. Apparatus for forming nut blanks comprising a dial having a plurality of die pockets adapted to receive nut blanks in which a central opening is to be formed, means for imparting a step by step rotary movement to said dial, tool holders arranged on opposite sides of said dial, means for reciprocating said tool holders toward and away from said dial, and a plurality of recessing punches carried by said tool holders, each punch in each tool holder cooperating with a punch in the other tool holder to form a pair of punches adapted to simultaneously act on a blank in one of said pockets, each punch of each pair entering the blank a distance less than one-half the thickness of the blank so that the metal will be displaced substantially symmetrically on each side of the median line of the blank, the step by step movement of the dial causing the blanks in each of said die pockets to be successively positioned between each pair of recessing punches to submit each blank to successive recessing operations.

6. Apparatus for forming nut blanks comprising a dial having a plurality of die pockets adapted to receive nut blanks in which a central opening is to be formed, means for imparting a step by step rotary movement to said dial, tool holders arranged on opposite sides of said dial, means for reciprocating said tool holders toward and away from said dial, a plurality of recessing punches carried by said tool holders, each punch in each tool holder cooperating with a punch in the other tool holder to form a pair of punches adapted to simultaneously act on a blank in one of said pockets, each punch of each pair entering the blank a distance less than one-half the thickness of the blank so that the metal will be displaced substantially symmetrically on each side of the median line of the blank, a trim punch arranged on one side of said carrier beyond said recessing punches, and means on the opposite side of said carrier in alignment with said trim punch for conveying scrap metal therefrom, the step by step movement of the dial causing the blanks in each of said die pockets to be successively positioned between each pair of recessing punches and between said trim punch and said conveying means to submit each blank to successive recessing operations, and said trimming operation.

7. Apparatus for forming nut blanks comprising a dial having a plurality of pockets, means for imparting a step-by-step rotary movement to said dial, tool holders arranged on opposite sides of said dial, stripper blocks carried by said tool holders and arranged between said tool holders and said dial, means for reciprocating said tool holders and said stripper blocks to opened and closed positions and means on said stripper blocks to engage said dial to prevent rotation of said dial.

8. Apparatus for forming nut blanks comprising a dial having a plurality of pockets, means for imparting a step-by-step rotary movement to said dial, tool holders arranged on opposite sides of said dial, stripper blocks carried by said tool holders and arranged between said tool holders and said dial, means for reciprocating said tool holders and said stripper blocks to opened and closed positions, stripper locks adapted to engage said stripper blocks when the parts are in closed position, and means on said stripper blocks to engage said dial to prevent rotation of said dial.

9. Apparatus for forming nut blanks comprising a dial having a plurality of pockets, means for imparting a step-by-step rotary movement to said dial, tool holders arranged on opposite sides of said dial, stripper blocks carried by said tool holders and arranged between said tool holders and said dial, means for reciprocating said tool holders and said stripper blocks to opened and closed positions, and means for automatically disengaging said dial from its drive when said stripper blocks are prevented from assuming a closed position.

10. Apparatus for forming nut blanks comprising a dial having a plurality of pockets, means for imparting a step-by-step rotary movement to said dial, tool holders arranged on opposite sides of said dial, stripper blocks carried by said tool holders and arranged between said tool holders and said dial, means for reciprocating said tool holders and said stripper blocks to opened and closed positions, means for automatically disengaging said dial from its drive when said stripper blocks are prevented from assuming a closed position, and means for returning said dial to its initial position at the beginning of a cycle when said drive mechanism is disengaged.

11. Apparatus for forming nut blanks comprising a dial having a plurality of pockets, means for imparting a step by step rotary movement to said dial, tool holders arranged on opposite sides of said dial, means for reciprocating said tool holders, recessing punches carried by said tool holders and arranged in pairs, and means for delivering oil to said punches whereby oil will be trapped beneath the heads of the punches in the recesses formed by the preceding punches and caused to exert hydraulic pressure in said recesses by said latter punches.

12. Apparatus for forming nut blanks comprising a dial having a plurality of pockets, means for imparting a step-by-step movement to said dial, tool holders arranged on opposite sides of said dial, means for reciprocating said tool holders toward and away from said dial, a plurality of punches carried by said tool holders to successively operate on blanks in said pockets and form central openings therein, and means for delivering oil to said punches whereby oil will be trapped beneath the heads of the punches in the recesses formed by the preceding punches and caused to exert hydraulic pressure in said recesses by said latter punches.

13. Apparatus for forming nut blanks, comprising a carrier having a plurality of die pockets adapted to receive nut blanks in which a central opening is to be formed, a plurality of recessing punches arranged in pairs on opposite sides of said carrier and adapted to simultaneously act on a plurality of blanks in said die pockets, each punch of each pair entering the blank a distance less than one-half the thickness of the blank so that the metal will be displaced substantially symmetrically on each side of the median line of the blank, a cupping die arranged beyond said recessing punches on one side of said carrier, a punch arranged on the opposite side of said carrier in alignment with said cupping die, means for advancing said die pockets successively to positions between said pairs of recessing punches and between said cupping die and said punch to submit each blank to successive recessing operations and to a cupping operation, and means for simultaneously reciprocating said punches.

14. Apparatus for forming nut blanks, comprising a carrier having a plurality of die pockets adapted to receive nut blanks in which a central opening is to be formed, a plurality of recessing punches arranged in pairs on opposite sides of said carrier and adapted to simultaneously act on a plurality of blanks in said die pockets, each punch of each pair entering the blank a distance less than one-half the thickness of the blank so that the metal will be displaced substantially symmetrically on each side of the median line of the blank, a cupping die arranged beyond said pairs of recessing punches and carried by one of said tool holders, a punch carried by the other tool holder in alignment with said cupping die, a trim punch carried by one of said tool holders beyond said cupping die means on the opposite side of said carrier in alignment with said trim punch for conveying scrap metal therefrom, means for advancing said die pockets successively to positions between said pairs of recessing punches, between said cupping die and said punch, and between said trim punch and said conveying means, to submit each blank to successive recessing operations, a cupping operation and a trimming operation, and means for simultaneously reciprocating said punches.

15. Apparatus for forming nut blanks comprising a dial having a plurality of pockets, means for imparting a step-by-step rotary movement to said dial, tool holders arranged on opposite sides of said dial, stripper blocks carried by said tool holders and arranged between said tool holders and said dial, means for reciprocating said tool holders and said stripper blocks, ears formed on opposite sides of said stripper blocks, stripper locks adapted to engage said ears, and positively actuated means for releasing said locks.

16. Apparatus for forming nut blanks comprising a dial having a plurality of pockets, means for imparting a step-by-step rotary movement to said dial, tool holders arranged on opposite sides of said dial, stripper blocks carried by said tool holders and arranged between said tool holders and said dial, means for reciprocating said tool holders and said stripper blocks, ears formed on opposite sides of said stripper blocks, stripper locks adapted to engage said ears, positively actuated means for releasing said locks, and spring cushioned means for closing said locks.

17. Apparatus for forming nut blanks comprising a dial having a plurality of pockets, means for imparting a step-by-step rotary movement to said dial, reciprocating tool holders arranged on opposite sides of said dial and adapted to alternately assume an opened and closed position, stripper blocks carried by said tool holders and arranged between said tool holders and said dial, stripper locks adapted to engage said stripper blocks when the stripper blocks are in closed position, and pivoted operating levers for actuating said stripper locks.

18. Apparatus for forming nut blanks comprising a dial having a plurality of pockets, means for imparting a step-by-step rotary movement to said dial, a reciprocating tool holder arranged adjacent said dial, and a feeding device for delivering a blank to one of said pockets upon each movement of said dial, said feeding device being actuated by the reciprocation of said tool holder and being adapted to be raised from its position adjacent said dial to permit access to said dial and tool holders and means for locking said feeding device.

19. Apparatus for forming nut blanks comprising means for advancing a blank to a plurality of successive stations, recessing punches arranged at said stations, means for reciprocating said punches, and means for delivering oil to said punches whereby oil will be trapped beneath the heads of the punches in the recesses formed by the preceding punches and caused to exert hydraulic pressure in said recesses by said latter punches.

20. Apparatus for forming nut blanks comprising a carrier having a plurality of die pockets adapted to receive nut blanks in which a central opening is to be formed, a plurality of recessing punches arranged adjacent said carrier, means for advancing said die pockets successively to positions in alignment with each of said punches, means for simultaneously reciprocating said punches and means for delivering oil to said punches whereby oil will be trapped beneath the heads of the punches in the recesses formed by the preceding punches and caused to exert hydraulic pressure in said recesses by said latter punches.

In testimony whereof we affix our signatures.

SAMUEL W. AVIS.
MALCOLM H. AMES.